(12) United States Patent
Cadoret et al.

(10) Patent No.: US 8,381,910 B2
(45) Date of Patent: Feb. 26, 2013

(54) STACKABLE UNIT

(75) Inventors: Bernard Cadoret, Mauron (FR); Olivier Marquet, Mauron (FR)

(73) Assignee: Armor Inox, Mauron (FR)

( * ) Notice: Subject to any disclaimer, the term of this patent is extended or adjusted under 35 U.S.C. 154(b) by 919 days.

(21) Appl. No.: 12/275,475

(22) Filed: Nov. 21, 2008

(65) Prior Publication Data

US 2009/0134052 A1  May 28, 2009

(30) Foreign Application Priority Data

Nov. 23, 2007 (FR) .................................. 07 08225

(51) Int. Cl.
*B65D 21/00* (2006.01)

(52) U.S. Cl. ............ 206/511; 206/564; 99/349; 99/426; 99/441

(58) Field of Classification Search .................. 206/511, 206/564, 509, 512, 518, 503, 561; 99/349, 99/426, 441, 353, 450, 448, 449
See application file for complete search history.

(56) References Cited

U.S. PATENT DOCUMENTS

| | | | | | |
|---|---|---|---|---|---|
| 647,388 | A | * | 4/1900 | Evans, W.I. ..................... | 134/88 |
| 3,003,839 | A | * | 10/1961 | Bloom et al. .................. | 312/111 |
| 3,196,229 | A | * | 7/1965 | Glass ............................ | 206/443 |
| 3,424,334 | A | * | 1/1969 | Goltz ............................ | 220/23.6 |
| 3,854,201 | A | * | 12/1974 | Dawidowicz et al. ......... | 30/40.2 |
| 3,907,111 | A | * | 9/1975 | Levenhagen .................. | 206/511 |
| 3,955,681 | A | * | 5/1976 | DeZinno ...................... | 211/85.1 |
| 4,895,256 | A | * | 1/1990 | Johnston ....................... | 206/501 |
| 5,394,986 | A | * | 3/1995 | Oya et al. ..................... | 206/445 |
| 6,743,008 | B2 | * | 6/2004 | Dreano ......................... | 425/233 |
| 6,811,042 | B2 | * | 11/2004 | Kelly et al. .................... | 211/74 |
| 2005/0172828 | A1 | * | 8/2005 | Dreano ......................... | 99/349 |

FOREIGN PATENT DOCUMENTS

| | | |
|---|---|---|
| FR | 2754677 | 4/1998 |
| FR | 2882630 | 9/2006 |
| WO | WO 97/34494 | 9/1997 |

* cited by examiner

*Primary Examiner* — Jacob K Ackun
*Assistant Examiner* — Jenine Pagan
(74) *Attorney, Agent, or Firm* — Gerald E. Helget; Nelson R. Capes; Briggs and Morgan, P.A.

(57) ABSTRACT

A stackable unit having two longitudinal sections and two transverse sections forming a frame with at least one trough having each end fixed to the transverse sections and a fixed cover underneath. Vertical posts are distributed over each longitudinal section for support of a unit stacked above it.

2 Claims, 3 Drawing Sheets

STACKABLE UNIT

CROSS REFERENCE TO RELATED APPLICATIONS

The present application is based on and claims priority to French Patent Application No. 07/08225, filed Nov. 23, 2007, the content of which is hereby incorporated by reference in its entirety.

BACKGROUND OF THE INVENTION

The present invention concerns a stackable unit comprising at least one trough intended to contain a food product such as ham during its cooking.

For carrying out the industrial cooking of ham, cooking it in a cooking chamber of relatively large volume is known. The hams are wrapped respectively in cooking bags which it is suitable to dispose in troughs of a stackable unit.

When this first stackable unit is full, it serves as a support for other stackable units which it is suitable to then fill and then successively stack one upon another to form a stack which is then transferred into a cooking chamber.

Each stackable unit comprises a frame whereof the sides consist of two transverse sections disposed opposite each other and two longitudinal sections disposed opposite each other. The transverse sections and the longitudinal sections are joined by their ends so as to form the frame.

Each trough open towards the top is mounted inside the frame so that its longitudinal axis is parallel to the longitudinal sections. Each trough extends between the two transverse sections and each end of each trough is fixed to one of the transverse sections.

Under each trough there is fixed a cover open towards the bottom which is mounted inside the frame so that its longitudinal axis is parallel to the longitudinal sections. Each cover extends between the two transverse sections. Each cover is fixed to the trough that hangs over it by means of connecting plates.

Thus, when two stackable units are superposed, each cover of the upper stackable unit comes to close a trough of the lower stackable unit so as to form a mould within which the ham to be cooked is disposed.

In order to obtain hams of constant cross-section all along the longitudinal axis, it is necessary to guarantee that each mould thus formed retains a constant cross-section all along the longitudinal axis, that is to say that the distance between the bottom of a trough and its cover remains constant.

When the troughs are small in length, the rigidity of the frame provides this constancy.

But more and more, the length of the troughs is increasing. The frame no longer provides the rigidity necessary for keeping this distance constant all along the troughs. In particular, the longitudinal sections could buckle under the weight of the hams. Moreover, in the case of a stackable unit of the prior art, each longitudinal section generally consists of a folded plate, and the contact between two superposed folded plates does not make it possible to guarantee a constant cross-section of the ham over its entire length.

One object of the present invention is to propose a stackable unit which does not have the drawbacks of the prior art and which in particular makes it possible to keep a constant cross-section between the trough of a lower stackable unit and the cover of the stackable unit just above.

SUMMARY OF THE INVENTION

To that end, a stackable unit is proposed, comprising:
two longitudinal sections;
two transverse sections joined to the longitudinal sections to produce a frame;
at least one trough whereof the longitudinal axis is parallel to the longitudinal sections and whereof each end is fixed to the transverse sections; and
under each trough there is fixed a cover, whereof the longitudinal axis is parallel to the longitudinal sections so that when the stackable unit is stacked on another identical stackable unit, each cover of said stackable unit comes to cover a is trough of the lower stackable unit;
the stackable unit being characterised in that it comprises at least two vertical posts distributed over and fixed to each longitudinal section, the upper face of each post serving as a rest for the lower surface of a post of a higher stackable unit, and the lower face of each post coming to rest on the upper face of a post of the lower stackable unit or on a floor.

Advantageously, each longitudinal section has a 'C'-shaped cross-section and each post is fixed to each horizontal end of said longitudinal section.

Advantageously, the stackable unit comprises at least two alignment studs and, for each alignment stud, an alignment aperture, each alignment stud being provided to be inserted into an alignment aperture of a second stackable unit during stacking, and each alignment aperture being provided to receive an alignment stud of a third stackable unit during stacking.

Advantageously, each alignment stud takes the form of a vertical cylinder whereof the base is fixed to the frame and whereof the free end is conical.

The characteristics of the invention mentioned above, as well as others, will emerge more clearly from a reading of the following description of one embodiment, said description being given in relation to the accompanying drawings, amongst which:

FIG. 1 depicts two stackable units according to the invention;

FIG. 2 depicts a section through a vertical plane of the stackable units of FIG. 1;

FIG. 3 depicts a stackable unit according to another embodiment of the invention;

FIG. 4 depicts a stackable unit according to another embodiment of the invention; and FIG. 5 depicts a stackable unit according to another embodiment of the invention.

BRIEF DESCRIPTION OF THE DRAWINGS

The following description is based on FIG. 1 which shows a stack of two identical stackable units 100a and 100b. The stackable unit 100a is the upper stackable unit and the stackable unit 100b is the lower stackable unit which is situated just underneath the upper stackable unit 100a.

The two stackable units 100a and 100b are identical and the various elements constituting them bear the same references suffixed by the letter 'a' or the letter 'b', if the element under consideration belongs to the upper stackable unit 100a or to the lower stackable unit 100b.

DETAILED DESCRIPTION OF ILLUSTRATIVE EMBODIMENTS

Figure 1:
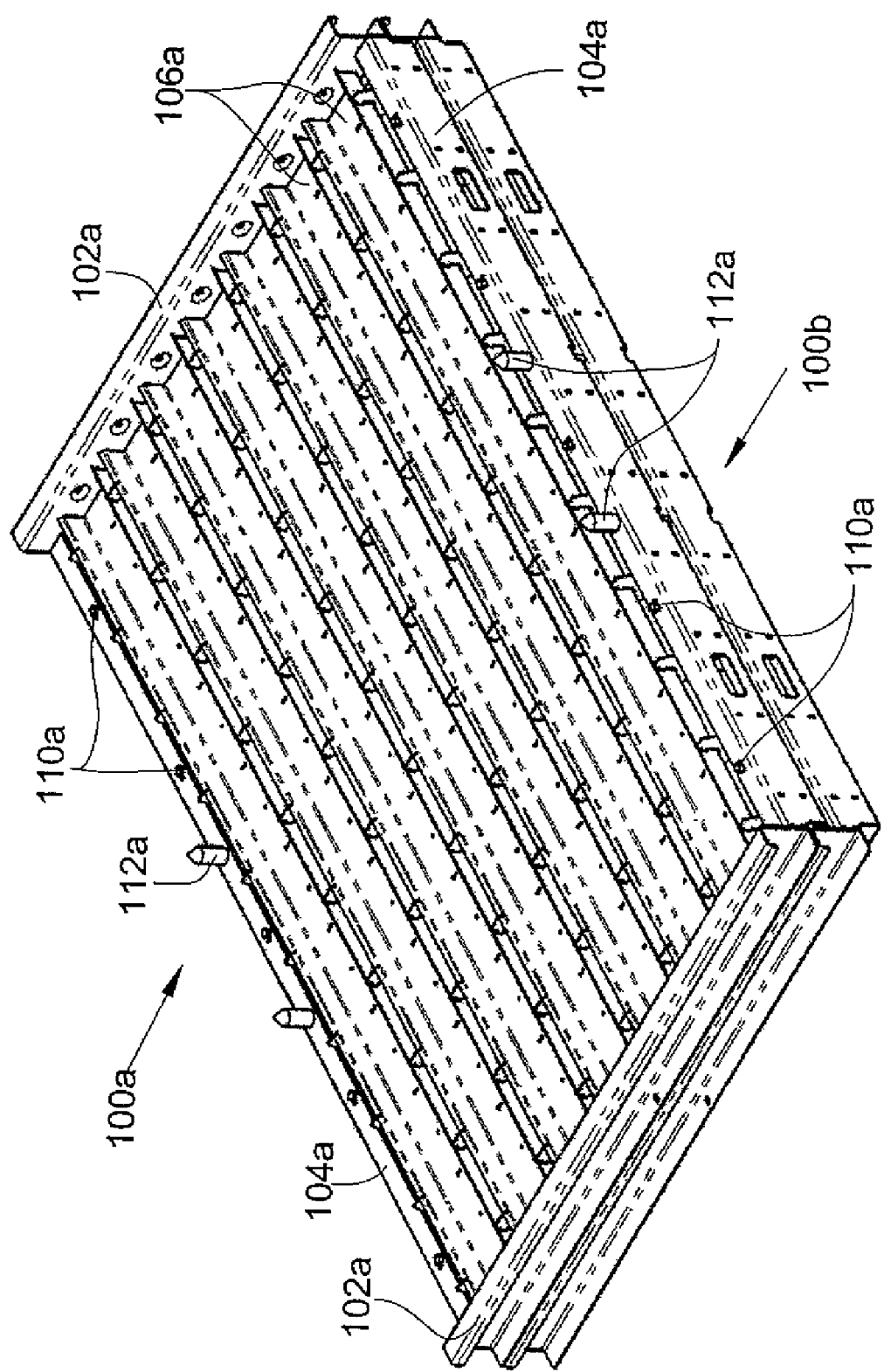

The structure of all the stackable units is identical and only the structure of the upper stackable unit 100a is described.

The stackable unit 100a consists of a frame that is produced by assembling two longitudinal sections 104a and two transverse sections 102a. The frame is rectangular and inside thereof is disposed at least one trough 106a intended to receive the ham to be cooked. The longitudinal sections 104a can consist of a folded plate. As is seen X better in FIG. 2, each trough 106a has a U-shaped cross-section open towards the top whereof the longitudinal axis is parallel to the longitudinal sections 104a and whereof each end is fixed to the transverse sections 102a. Inside the frame there is also fixed, under each trough 106a, a cover 108a. The fixing of the cover 108a under the trough 106a is provided here by means of a connecting plate. Each cover 108a is aligned under a trough 106a, and has a U-shaped cross-section open towards the bottom. The longitudinal axis of each cover 108a is parallel to the longitudinal sections 104a. Thus, when the upper stackable unit 100a is stacked on the lower stackable unit 100b, each cover 108a of the upper stackable unit 100a comes to cover a trough 106b of the lower stackable unit 100b.

To avoid buckling of the longitudinal sections 104a under the weight of the hams stored in the troughs 106a, the stackable unit 100a comprises at least two vertical posts 110a distributed over and fixed to each longitudinal section 104a. The lower face of each post 110a comes to rest on the upper face of a post 110b of the lower stackable unit 100b. The lower face of each post 110b comes to rest on a floor 202 for the lowest stackable unit 100b. Where a third upper stackable unit is stacked on the stackable unit 100a, the upper face of each post 110a serves as a rest for the lower surface of a post of this third upper stackable unit.

As is shown for each post 110b of the lower stackable unit 100b which serves as a rest for the lower surface of a post 110a of the upper stackable unit 100a, such an arrangement allows a transfer of forces directly through the posts 110a and 110b to a floor 202 which can be the bottom of a cooking chamber or the ground.

The distribution of each post 110a, 110b is such that the spacing between each post 110a, 110b does not allow buckling of the longitudinal sections 104a. In the embodiment proposed, the longitudinal sections 104a have a length for example of 3 m and there are 5 posts distributed over each longitudinal section 104a.

The length and vertical positioning of each post 110a, 110b are such that the transverse sections 102a and 102b of two stackable units 100a and 100b stacked one upon the other are not in contact. The resting of each upper stackable unit 100a on the lower stackable unit 100b, as well as its coming into abutment, are implemented by the same components, namely the posts 110a and 110b.

On account of the non-buckling of the longitudinal sections 104a, the cross-section of each ham mould constituted by the trough 106b of the lower stackable unit 100b and the cover 108a of the upper stackable unit 100a is constant over the entire length.

In the embodiment presented in the figures, each longitudinal section 104a has a 'C'-shaped cross-section defined by a horizontal upper end 204a and a horizontal lower end 206a, this geometry making it possible to increase the rigidity of the longitudinal section 104a. Each post 110a is fixed to the horizontal upper end 204a and the horizontal lower end 206a of the longitudinal section 104a. This structure makes it possible to obtain great rigidity of the post 110a and accurate positioning.

Similarly, the post 110b of the lower stackable unit 100b is fixed to the horizontal upper end 204b and the horizontal lower end 206b of the longitudinal section 104b with 'C'-shaped cross-section.

In order to ensure that the upper stackable unit 100a aligns with the lower stackable unit 100b during stacking, the lower stackable unit 100b comprises at least two alignment studs 112b and, for each alignment stud 112b, the upper stackable unit 100a comprises an alignment aperture. Each alignment stud 112b of the lower C stackable unit 100b is provided to be inserted in one of the alignment apertures of the upper stackable unit 100a.

Figure 2:
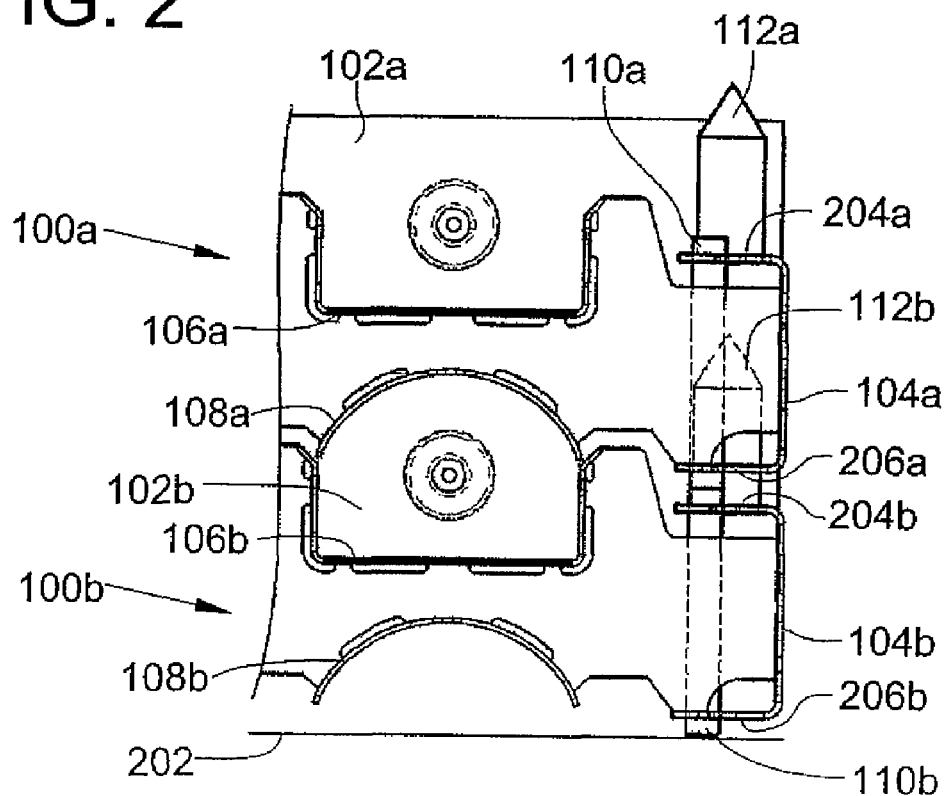

In the embodiment depicted in FIG. 2, each alignment stud 112a takes the form of a vertical cylinder whereof the base is fixed to the frame and whereof the free end is conical to facilitate entry and alignment of the upper stackable unit.

For one and the same stackable unit 100a, the base of the alignment stud 112a is fixed to a longitudinal section 104a and, in particular, to the horizontal upper end 204a and extends vertically upwards, and the alignment aperture is made in the horizontal lower end 206a.

Figure 3:
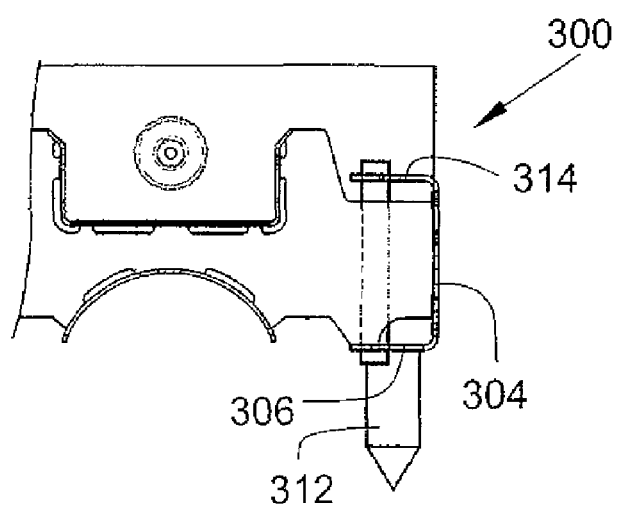

In the embodiment depicted in FIG. 3, for one and the same stackable unit 300 comprising a longitudinal section 304, each alignment stud 312 is fixed to the horizontal lower end 306 of the longitudinal section 304 and extends vertically downwards. The alignment aperture is made in the horizontal upper end 314 of the longitudinal section 304.

Thus, in general terms, each stackable unit 100a, 300 comprises at least two alignment studs 112a, 312 and, for each alignment stud 112a, 312, an alignment aperture, each alignment stud 112a, 312 being provided to be inserted in an alignment aperture of a second stackable unit (lower or upper) during stacking, and each alignment aperture being provided to receive an alignment stud of a third stackable unit (upper or lower) during stacking.

Figure 4:
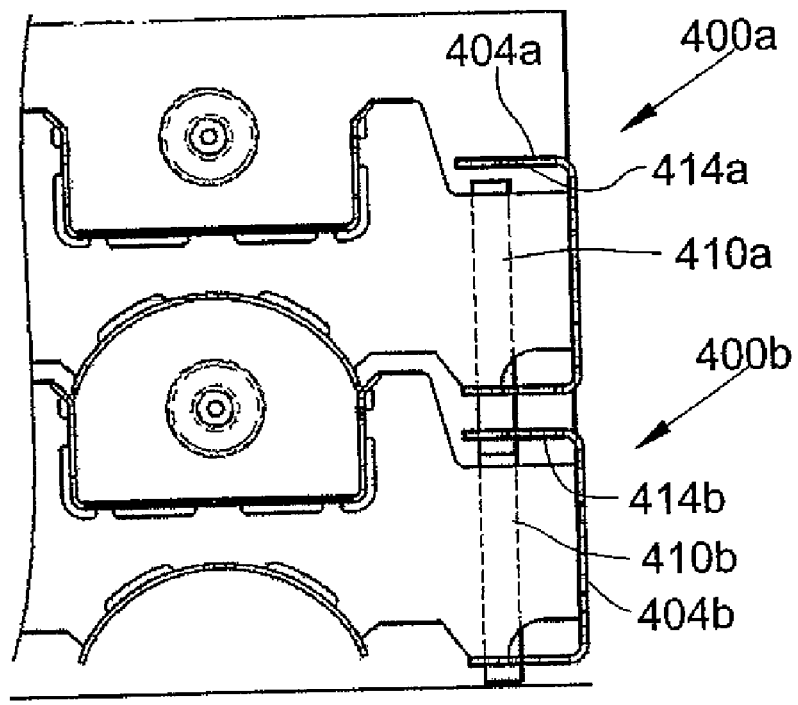

In the embodiment depicted in FIG. 4, for one and the same stackable unit 400a comprising a longitudinal section 404a, each post 410a also serves as an alignment stud. For example, to that end, it is possible to shorten the upper end of each post 410a below the horizontal upper end 414a of the longitudinal section 404a and to lengthen accordingly the lower end of each post 410a. The lower end of each post 410a is inserted into an alignment aperture in the horizontal upper end 414b of the longitudinal section 404b of the stackable unit 400b just below and as far as coming into contact with the upper end of the post 410b of said stackable unit 410b just below.

Figure 5:
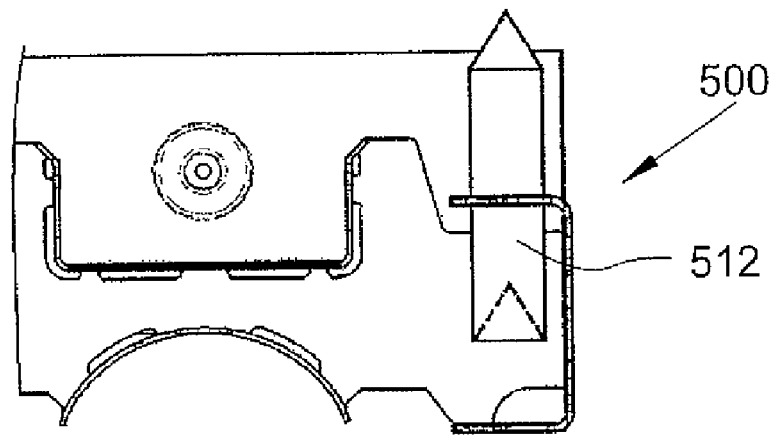

In the embodiment depicted in FIG. 5, for one and the same stackable unit 500, each alignment stud 512 also serves as a post. Alignment can for example be provided by the lower end of each alignment stud 512 having a conical recess which fits onto the upper end of an alignment stud of a stackable unit just below. To that end, the upper end of each alignment stud 512 has a conical shape adapted to the conical recess.

Of course, the present invention is not limited to the examples and embodiments described and depicted, but is capable of many variants accessible to persons skilled in the art.

The invention claimed is:

1. A stackable unit (100a) comprising:
   (a) two longitudinal sections (104a), each having a 'C'-shaped cross-section comprising a horizontal upper end (204a) and a horizontal lower end (206a);
   (b) two transverse sections (102a) joined to the longitudinal sections (104a) to produce a frame;
   (c) at least one trough (106a) intended to contain a food product where the longitudinal axis is parallel to the longitudinal sections (104a) and where each end is fixed to the transverse sections (102a);
   (d) under each trough (106a) there is fixed a cover (108a), where the longitudinal axis is parallel to the longitudinal sections (104a) so that when the stackable unit (100a) is stacked on another identical stackable unit (100b), each cover (108a) of the stackable unit (100a) comes to cover a trough (106b) of the lower stackable unit (100b); and
   (e) further comprising at least two vertical posts (110a) distributed over and fixed to each longitudinal section (104a), the upper face of each post (110a) serving as a rest for the lower surface of a post of a higher stackable unit, and the lower face of each post (110a) coming to rest on the upper face of a post (110b) of the lower stackable unit (100b) or on a floor;
(f) further comprising at least two alignment studs (112a) and, for each alignment stud (112a), an alignment aperture, each alignment stud (112a) being insertable into an alignment aperture of a second stackable unit during stacking, and each alignment aperture being provided to receive an alignment stud of a third stackable unit during stacking.

2. The stackable unit (100a) of claim 1 wherein each alignment stud (112a) takes the form of a vertical cylinder where the base of said cylinder is fixed to the frame and where the free end is conical.

* * * * *

UNITED STATES PATENT AND TRADEMARK OFFICE
CERTIFICATE OF CORRECTION

| | | |
|---|---|---|
| PATENT NO. | : 8,381,910 B2 | Page 1 of 1 |
| APPLICATION NO. | : 12/275475 | |
| DATED | : February 26, 2013 | |
| INVENTOR(S) | : Cadoret et al. | |

It is certified that error appears in the above-identified patent and that said Letters Patent is hereby corrected as shown below:

In the Specifications:

At Col. 3, line 2, please delete "As is seen X" and insert --As is seen-- therefor.

At Col. 4, line 1, please delete "lower C" and insert --lower-- therefor.

Signed and Sealed this
Thirtieth Day of April, 2013

Teresa Stanek Rea
*Acting Director of the United States Patent and Trademark Office*